3,415,889
PRODUCTION OF THIOL COMPOUNDS
Rector P. Louthan, Bartlesville, Okla., assignor to Phillips
Petroleum Company, a corporation of Delaware
No Drawing. Filed Sept. 14, 1964, Ser. No. 396,424
13 Claims. (Cl. 260—609)

This invention relates to the production of thiols.

Aeromatic and heterocyclic thiols are well known compounds, a large number of which are used commercially. Such compounds, especially thiophenol, are used in the rubber industry, for example, as rubber plasticizers and in the reclaiming of rubber. Heretofore a method which has been used for the manufacture of thiophenol is the reduction of benzene sulfonyl chloride with zinc dust in sulfuric acid. However, this process tends to be tedious and expensive and thus impedes practical development of the field.

Surprisingly, it has been found that upon acidifying the material produced by reacting certain polyhalo compounds or sulfide compounds with an excess of an alkali metal sulfide at a temperature of at least 250° C. and in the presence of a polar organic solvent there is produced a thiol, i.e., a compound of the type RSH (monothiol), instead of the expected polythiol. Thus, according to this invention monothiols such as thiophenol are made without the use of expensive reactants such as zinc dust.

Accordingly, it is an object of this invention to provide a new and improved process for the production of aromatic and heterocyclic thiols.

It is another object of this invention to provide a new and improved process for the production of a thiol from certain polymers.

Other aspects, objects and the several advantages of this invention are apparent from a study of this disclosure and the appended claims.

According to the process of this invention, aromatic heterocyclic thiols are produced by acidifying the product of the reaction of an excess of an alkali metal sulfide with at least one material selected from the group consisting of (1) polyhalo aromatic compounds or polyhalo heterocyclic compounds, (2) polymers resulting from the reaction of a polyhalo aromatic or polyhalo heterocyclic compound with an alkali metal sulfide, (3) diaryl sulfides, and (4) di(alkaryl)sulfides at a temperature of at least 250° C. and in the presence of a polar organic solvent.

The polyhalo aromatics and polyhalo heterocyclic compound which can be reacted with alkali metal sulfides to form aromatic thiols or heterocyclic thiols are represented by the formulas:

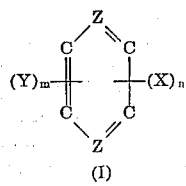
(I)

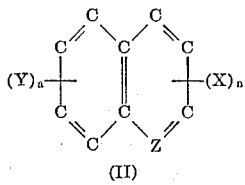
(II)

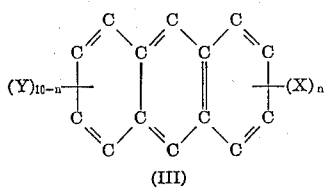
(III)

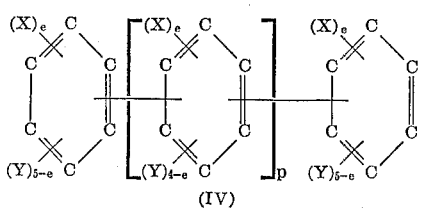
(IV)

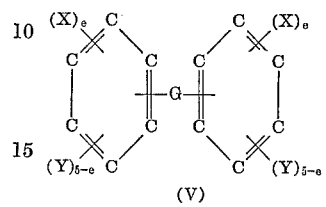
(V)

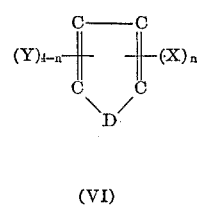
(VI)

wherein each X is a halogen selected from the group consisting of chlorine, bromine, iodine, and fluorine, preferably chlorine and bromine, each Y is selected from the group consisting of hydrogen, —R, —N(R)$_2$,

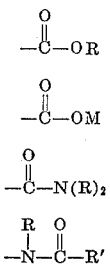

—O—R', —S—R', —SO$_3$H, and —SO$_3$M, wherein each —R is selected from the group consisting of hydrogen and alkyl, cycloalkyl, aryl, aralkyl and alkaryl radicals containing from 1 to 12 carbon atoms, inclusive; each R' is selected from the group consisting of alkyl, cycloalkyl, aryl, aralkyl and alkaryl radicals containing from 1 to 12 acrbon atoms, inclusive; each Z is selected from the group consisting of —N= and —C=; D is selected from the group consisting of —O—, and —S—, and $$-\overset{R}{\underset{|}{N}}-$$

G is selected from the group consisting of

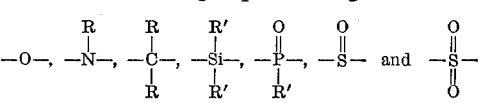

M is an alkali metal selected from the group consisting of sodium, potassium, lithium, rubidium and cesium; n is selected from the group consisting of 2 and 3; when both Z's in Formula I are —C=, m equals 6–n; when one Z in Formula I is —C=, m equals 5–n; when both Z's in Formula I are —N=, m equals 4–n; when Z in Formula II is —C=, a equals 8–n; when Z in Formula II is —N=, a equals 7–n; each e is a whole integer of from 0 to 3 such that the total halogen atoms in the compounds of Formulas IV and V is at least 2 and does not exceed 4; and p is a whole integer selected from the group consisting of 0 and 1.

It is to be understood that the substituents, Y and X, on the rings of the compounds of the above formulas can be at any position. For example, in Formulas II and III above, it is intended that the X and Y groups can be located on any of the carbons in any of the aromatic or heterocyclic rings present in the compounds.

The compounds of the above general formula which are preferred are dihaloaromatics selected from the group consisting of dihalobenzene, dihalotoluene, dihalooxylene, dihaloethylbenzene, dihalodiethylbenzene, dihalonaphthalene, diahalomethylnaphthalene, dihalodimethylnaphthalene, dihaloethylnaphthalene and dihalodiethylnaphthalene wherein the halo part is selected from the group consisting of chlorine and bromine.

The polymers which are reacted with alkali metal sulfides to form thiols according to the process of this invention are those which result from the reaction of one or more of the compounds of the above general formulas with an alkali metal sulfide at a mol ratio of polyhalo-substituted aromatic or heterocyclic compound/alkali metal sulfide ranging from 0.9/1 to 1.1/1. The polymers formed are characterized by a series of repeating units in which aromatic or heterocyclic ring structures are connected to other heterocyclic or aromatic ring structures by sulfur atoms. As, for example, the polymers formed by reaction of $Na_2S$ with compounds of Formula I above wherein $n=2$ contain the repeating unit:

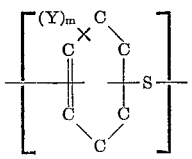

The preferred polymers are those obtained by reacting $Na_2S$ with the above preferred dihaloaromatic compounds in the mol ratio of dihaloaromatic/$Na_2S$ of from 0.9/1 to 1.1/1 in the presence of a polar organic solvent selected from the group consisting of cyclic and acyclic carboxylic acid amides containing from 3 to 6 carbon atoms per molecule.

The diaryl sulfides and di(alkaryl)sulfides which form another class of reactants are represented by the formula R''—S—R'' wherein each R'' is selected from the group consisting of aryl and alkaryl radicals containing from 6 to 18 carbon atoms per molecule, inclusive, and preferably is aryl radicals containing from 6 to 10 carbon atoms per molecule, inclusive.

Some examples of polyhalo-substituted compounds of Formulas I through VI which can be employed in the present invention are 1,2-dichlorobenzene,
1,3-dichlorobenzene,
1,4-difluorobenzene,
2,5-dibromoaniline,
N,N-dimethyl-2,5-dibromoaniline,
1-n-butyl-2,5-dichlorobenzene,
1-cyclohexyl-2,5-diiodobenzene,
1-isooctyl-2,4-difluorobenzene,
1-n-dodecyl-2,5-dichlorobenzene,
1-benzyl-2,5-dibromobenzene,
1,4-di-n-butyl-2,5-dichlorobenzene,
1,4-di-n-nonyl-2,6-dibromobenzene,
1,4-dibromo-2,3,5,6-tetra(4-ethylphenyl)benzene,
methyl-2,5-dichlorobenzoate,
2,5-dichlorobenzoamide,
cyclohexyl-N-methyl-2,5-dibromoacetanilide,
1,4-dibromonaphthalene,
1,4-dichloro-7,8-diethylnaphthalene,
1-methoxy-2,5-dichlorobenzene,
1-cyclohexylthio-2,5-dichlorobenzene,
n-octyl-2,4-dibromonaphthalene-1-carboxylate,
1-acetamido-2,4-dibromonaphthalene,
8-decoxy-1,4-difluoronaphthalene,
6,7-dibenzyl-8-methylthio-1,4-dichloronaphthalene,
1,4-dichloroanthracene,
1,7-dibromo-6-cyclohexylanthracene,
2,8-diiodo-3,7-diethylanthracene,
1-dodecyl-2,6-difluoroanthracene,
2,6-dibromo-8-aminoanthracene,
3,7-diiodo-4-cyclohexylthioanthracene,
n-decyl-3,8-difluoroanthracene carboxylate,
1-acetamido-2,4-dibromoanthracene,
4,4'-dichlorobiphenyl,
3,4'-dibromo-2-aminobiphenyl,
2,2',4-tribromo-7-acetamidobiphenyl,
3,3'-dichloro-4,4'-didodecylbiphenyl,
4,4'-diiodo-3-ethoxy-6-n-octylbiphenyl,
4,4'dichloro-3,3'-dicyclohexylbiphenyl,
4,4''-dibromo-p-terphenyl,
3,3',3''-trichloro-p-terphenyl,
4,4''-dichloro-3'-acetamido-p-terphenyl,
4,4'''-difluoro-2,2',2''-tri-n-decyl-3'-methoxy-p-terphenyl,
4,4'-dibromo-3'-carbutoxy-p-terphenyl,
4,4''-dichloro-2-(N-acetylamino)-p-terphenyl,
3,4-dibromothiophene,
3,4-dichlorofuran,
3,4-difluoropyrrole,
2,5-dibromo-4-aminothiophene,
2,5-dichloro-3-ethoxythiophene,
3,4-difluoro-5-acetamidofuran,
3,4-dibromo-5-carbethoxypyrrole,
2,5-dichloropyridine,
3,5-dibromo-4-methylpyridine,
4,8-diiodoquinoline,
4-chlorobromobenzene,
2,5-dichlorobenzene-sulfonic acid,
sodium 2,5-dibromobenzenesulfonate,
2,8-difluoronaphthalenecarboxylic acid,
lithium 2,7-diiodoanthracenecarboxylate,
p,p'-dichlorodiphenyl ether,
o,p'-dibromodiphenylamine,
2,4'-difluorodiphenylmethane,
3,3'-dichlorodiphenyl dimethylsilane,
di(2-methyl-4-bromophenyl)sulfoxide,
methyl di(3-ethyl-4-chlorophenyl)phosphite,
4-bromophenyl-3-n-butyl-4-chlorophenyl sulfone,
2,6-dichloropyrazine,
1,2,4-trichlorobenzene,
2,4,6-tribromotoluene,
2,3,5-triiodoaniline,
2,4,6-trichlorobenzoamide,
ethyl 2,4,6-tribromobenzoate,
1,4,8-trifluoronaphthalene,
1-methoxy-2,7,8-trichloronaphthalene,
1,5,9-tribromoanthracene,
1,2,2'-tribromo-3-cyclohexyl-p-terphenyl,
2,5,6-tribromopyrazine,
1,2,3-trichlorobiphenyl ether, and the like.

Some examples of diaryl sulfides and di(alkaryl)sulfides which can be employed as reactants in the present invention are diphenyl sulfide, di(4-methylphenyl)sulfide, di(3-ethylphenyl)sulfide, di(2-methyl-4-isopropylphenyl) sulfide, di(2,4-diethylphenyl)sulfide, dinapththyl sulfide, phenyl-4-methylphenyl sulfide, di(2-ethyl-4-n-decylphenyl)sulfide, phenyl naphthyl sulfide, di(4-biphenylyl) sulfide, di(4-[p,p'-terphenylyl])sulfide, and 4-biphenylyl phenyl sulfide.

The alkali metal sulfides which can be employed in the process of this invention are the monosulfides of sodium, potassium, lithium, rubidium, and cesium, preferably sodium, including the anhydrous and hydrated forms of these sulfides. Such sulfides can be charged to the reaction zone per se, or they can be formed in the reactor by charging an alkali metal hydroxide and hydrogen sulfide at a mol ratio of about 2/1 of alkali metal hydroxide/$H_2S$.

The process of this invention is carried out in a polar organic solvent in which the halo-substituted aromatics or heterocyclics or polymers as described above or sulfides and alkali metal sulfides are at least partially soluble. Representative examples of suitable classes of compounds include amides, lactams, sulfones and the like. The preferred solvents are selected from the group consisting of cyclic and acyclic carboxylic acid amides having from 3 to 6 carbon atoms per molecule. Specific examples of suitable solvents are N-methyl-2-pyrrolidone, pyrrolidone, caprolactam, N-ethylcaprolactam, sulfolane, dimethylacetamide, tetramethylurea, hexamethylphosphoramide, and N,N'-ethylenedipyrrolidone.

The amount of polar organic solvent in the reaction zone can vary over a wide range, but will generally range from about 100 to 2500 ml. per mol of alkali metal sulfide reactant, preferably about 250 ml. per mol on the same basis.

The process of this invention is carried out by contacting the above-defined reactants in at least one polar solvent at a temperature of at least 250° C., preferably from 250° to about 450° C., and still more preferably from 260° to 350° C.

The mol ratio of alkali metal sulfide reactant/halo-substituted compound or polymer or sulfide can vary considerably. The mol ratio of alkali metal sulfide/halo-substituted aromatic or heterocyclic compound should be at least 2, but excess sodium sulfide as high as 5 mols of alkali metal sulfide per mol of halo-substituted aromatic or heterocyclic compound can be employed. The preferred mol ratio of alkali metal sulfide/halo-substituted aromatic and heterocyclic compound is from about 2 to about 3. When preparing thiols by the process of this invention wherein there is used either a polymer, as defined above, or an R″—S—R″ compound for the reaction with an alkali metal sulfide, the amount of alkali metal sulfide employed should be at least one gram mol/gram atom of sulfur present in the polymer or R″—S—R″ compound and can be as high as 5 gram mol/gram atom of sulfur present.

The product of the reaction of the polyhalo compounds or sulfide compounds of this invention with an excess of an alkali metal sulfide must be acidified with a mineral acid, preferably hydrogen chloride or sulfuric acid, and preferably to a pH of at least 6.5, to produce the thiol product of this invention.

The process of this invention will be carried out at autogenous pressures and this pressure can run as high as 1000 p.s.i. or greater, depending upon the chosen reactants and polar solvent. Reaction times can vary from a few minutes to several days, but will generally depend upon the chosen reactant temperature with longer reaction times being used with lower temperatures, and vice versa. The reaction can be carried out batchwise or continuously. Recovery of the thiol product can be effected by conventional procedures. Normally, the reaction mixture is acidified with an acid such as hydrochloric acid to convert the product from the alkali metal mercaptide form to the thiol form. The thiol can then be recovered by such processes as distillation, crystallization, extraction and the like.

The typical aromatic thiols which can be prepared by this process include benzenethiol(thiophenol), 4-methylbenzenethiol, 4-carboxybenzenethiol, naphthalenethiol, biphenylthiol, terphenylthiol, and the like. Other thiols containing a wide variety of other substituent groups can be prepared by this process and should be obvious to those skilled in the art upon reading the foregoing disclosure and the included formulas.

The following specific examples are intended to illustrate the advantages of the process of this invention, but it is not intended that the invention be limited to the specific features shown therein.

EXAMPLE I

A run was carried out in which p-dichlorobenzene and sodium sulfide were reacted according to the process of this invention to form thiophenol.

In this run, 2000 ml. of N-methyl-2-pyrrolidone, 320 grams (8.0 mols) of sodium hydroxide, 294 grams (2.0 mols) of p-dichlorobenzene and 136 grams (4.0 mols) of hydrogen sulfide were heated at 260° C. for 5.5 hours. The reaction mixture was then cooled to 200° F. and removed from the autoclave. The reaction slurry was then made acid with about 350 ml. of concentrated hydrochloric acid which caused a brown solid polymer to precipitate from solution.

In order to separate the product of the process of this example from other materials present in the reaction mass the following steps were employed. About 2 liters of water was then added, and the solid was filtered out. The remaining filtrate was extracted with 2 liters of ether, after which the ether was evaporated on a steam bath to obtain 65.2 grams of a red liquid, refractive index $n_D^{20}$ 1.5733. The solid and red liquid were added to a 40 percent aqueous caustic solution (800 grams of solution total) and all appeared to go into solution. The caustic solution was then extracted with 1 liter of ether, which on evaporation on a steam bath yielded 28.2 grams of a dark liquid which contained no thiophenol and had a refractive index of $n_D^{20}$ 1.5008. The caustic (NaOH) solution was made acid with 800 ml. of concentrated hydrochloric acid, after which about 1 liter of water was added to the acidified mixture and the mixture was extracted with chloroform. After stripping off the chloroform, the remaining material was distilled to yield 55 grams of a product having a boiling point of about 169.5° C. and a refractive index of about $n_D^{23}$ 1.5861 which proves the product to be thiophenol. The kettle bottoms from the distillation were recrystallized from benzene to obtain 63.2 grams of a light tan powder, melting point 125–130° C., which was poly(phenylenesulfide) having the low molecular weight of 510.

This run was repeated with the same charge, and 123 grams of thiophenol was recovered. This represents a yield of 56 percent theoretical based on the charged p-dichlorobenzene.

This example shows that a polyhalo compound is converted by this invention to a thiol, i.e., monothiol, which is quite unexpected. For example, one would expect a dithiol to be produced when reacting one mol of p-dichlorobenzene and two mols of sodium sulfide rather than a thiol.

EXAMPLE II

The procedure of Example I was repeated except that the reactants were heated at 220° C. for 5.5 hours instead of the 260° C. which was employed in Example I. No thiophenol was isolated from the reaction mixture. The major product (187.1 grams) was a white, finely divided polymer solid which had a melting point of 200–230° C.

The high-melting polymer product above, in the amount of 160 grams, was heated with 120 grams of sodium hydroxide, 51 grams of hydrogen sulfide, and 1500 ml. of N-methyl-2-pyrrolidone for 5.5 hours at 260° C. After discharging, the autoclave was washed with 500 ml. of water and the wash was combined with the product. The reaction solution was made acid with about 300 ml. of concentrated hydrochloric acid, after which the acidified solution was diluted with an additional liter of water and extracted with ether. The phases were then separated and the ether phase was washed with water, stripped and distilled. By this distillation 110 grams of thiophenol was recovered.

EXAMPLE III

A run was carried out by the method of this invention wherein 1,2,4-trichlorobenzene was reacted with Na₂S.

In this run, 1500 ml. of N-methyl-2-pyrrolidone, 181.5 grams (1 mol) of 1,2,4-trichlorobenzene, 6 mols of NaOH and 3 mols of H₂S were charged to an autoclave, heated to 300° C. and maintained at this temperature for 5.5 hours. The reaction mixture was cooled, diluted with water, made acid with concentrated aqueous HCl, and extracted with ether. The ether extract phase was separated and washed with water, after which the ether was stripped off. The remaining material was then distilled to yield 25 grams of thiophenol.

EXAMPLE IV

A run was carried out in which high molecular weight poly(phenylene sulfide) was converted to thiophenol by the process of this invention.

In this run, a sample of high molecular weight poly(phenylene sulfide) prepared by the reaction of equimolar quantities of p-dichlorobenzene and sodium sulfide in N-methyl-2-pyrrolidone was treated in the following manner: 108 grams of the high molecular weight polymer, 1000 ml. of N-methyl-2-pyrrolidone, 80 grams of sodium hydroxide and 34 grams of hydrogen sulfide were charged to an autoclave and heated at 260° C. for 5.5 hours. The reaction product was then worked up by the procedure of Example II, yielding 56 grams of thiophenol, and a light tan solid, after which recrystallization from benzene melted at 125 to 130° C. This low-melting polymer was poly(phenylene sulfide) having the low molecular weight of 510.

Examples II and III show that high polymers are cleaved or degraded in a fashion which yields a thiol, i.e., thiophenol, in the presence of excess sodium sulfide.

EXAMPLE V

In still another run, diphenyl sulfide was converted to thiophenol by the process of this invention.

In this run, 372 grams of diphenyl sulfide, 160 grams of sodium hydroxide, 68 grams of hydrogen sulfide, and 2000 ml. of N-methyl-2-pyrrolidone were heated at 300° C. for 5.5 hours. The resulting reaction mixture was worked up as in the previous runs, and the extract phase from the ether extraction was distilled to yield 147.4 grams of thiophenol and 137.2 grams of unreacted diphenyl sulfide.

This example shows a sulfide is converted by this invention to a thiol.

Reasonable variations and modifications of this invention can be made, or followed, in view of the foregoing, without departing from the spirit or scope thereof.

I claim:

1. A method for the preparation of a thiol comprising contacting at a temperature of at least 250° C. and in the presence of a polar organic solvent selected from the group consisting of cyclic and acyclic carboxylic acid amides having from 3 to 6 carbon atoms per molecule an alkali metal monosulfide and at least one material selected from the group consisting of a polyhalo aromatic compound, a polyhalo heterocyclic compound, a polymer resulting from the reaction of an excess of a polyhalo aromatic compound with an alkali metal monosulfide, a polymer resulting from the reaction of an excess of a polyhalo heterocyclic compound with an alkali metal monosulfide, a diaryl sulfide and a di(alkaryl)sulfide, the mol ratio of alkali metal monosulfide to the above polyhalo aromatic and polyhalo heterocyclic compounds being from about 2/1 to about 5/1 and the ratio of alkali metal monosulfide to the above polymers, to the diaryl sulfide and to the di(alkaryl)sulfide being such as to provide from about 1/1 to about 5/1 gram mols of alkali metal monosulfide per gram atom of sulfur present in the polymers, diaryl sulfide or di(alkaryl)sulfide to produce a product, and acidifying said product with a mineral acid thereby producing the desired thiol, the total halogen atoms in said polyhalo compounds not exceeding 4.

2. The method of claim 2 wherein said alkali metal monosulfide is formed in situ by the contacting of said material with a sulfur-containing compound and an alkali metal compound which is not sulfur containing but which can be reacted with said sulfur-containing compound at said temperature of at least 250° C. and in said polar organic solvent to produce an alkali metal monosulfide.

3. A method for the preparation of a thiol comprising contacting at a temperature of at least 250° C. and in the presence of a polar organic solvent selected from the group consisting of cyclic and acyclic carboxylic acid amides having from 3 to 6 carbon atoms per molecule a stoichiometric excess of an alkali metal monosulfide with at least one material selected from the group consisting of:

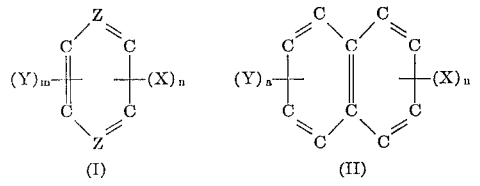

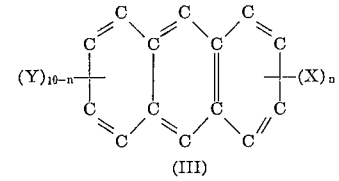

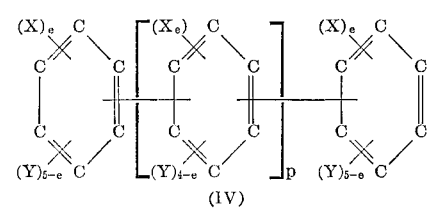

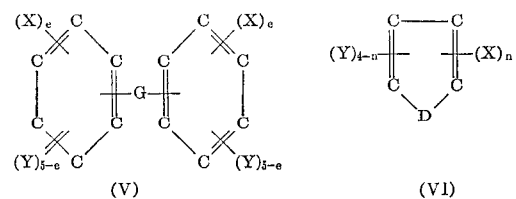

wherein each X is a halogen selected from the group consisting of chlorine, bromine, iodine and fluorine, each Y is selected from the group consisting of hydrogen, —R, —N(R)$_2$,

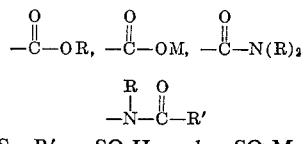

—O—R′, —S—R′, —SO$_3$H, and —SO$_3$M, wherein each —R is selected from the group consisting of hydrogen and alkyl, cycloalkyl, aryl, aralkyl and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

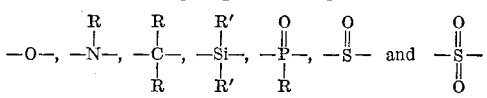

M is an alkali metal selected from the group consisting of sodium, potassium, lithium, rubidium and cesium; $n$ is selected from the group consisting of 2 and 3; when both Z's in Formula I are —C=, $m$ equals 6—$n$; when one Z in Formula I is —C=, $m$ equals 5—$n$; when both Z's in Formula I are —N=, $m$ equals 4—$n$; when Z in Formula II is —C=, $a$ equals 8—$n$; when Z in Formula II is —N=, $a$ equals 7—$n$; each $e$ is a whole integer of from 0 to 3 such that the total halogen atoms in the compounds of Formulas IV and V is at least 2 and does not exceed 4; and p is a whole integer selected from the group consisting of 0 and 1; and acidifying the reaction product with a mineral acid to produce the desired thiol.

4. A method as in claim 3 wherein said material contains not more than 3 halogen atoms, the temperature is in the range of about 250° to about 450° C., and the mol ratio of alkali metal monosulfide to said material is about 2/1 to about 5/1.

5. A method for the preparation of a thiol comprising contacting at a temperature of at least 250° C. and in the presence of a polar organic solvent selected from the group consisting of cyclic and acyclic carboxylic acid amides having from 3 to 6 carbon atoms per molecule a stoichiometric excess of an alkali metal monosulfide with at least one dihalo aromatic selected from the group consisting of dihalobenzene, dihalotoluene, dihaloxylene, dihaloethylbenzene, dihalodiethylbenzene, dihalonaphthalene, dihaloethylnaphthalene, and dihaloethylnaphthalene wherein the halo part is selected from the group consisting of chlorine and bromine, and acidifying the reaction product to a pH of at least 6.5 with a mineral acid to produce the desired thiol.

6. A method for the preparation of a thiol comprising contacting at a temperature of at least 250° C. and in the presence of N-methyl-2-pyrrolidone a stoichiometric excess of an alkali metal monosulfide with at least one material selected from the group consisting of dichlorobenzene and trichlorobenzene and acidifying the reaction product to a pH of at least 6.5 with a mineral acid to produce the desired thiol.

7. A method for the preparation of a thiol comprising contacting at a temperature of at least 250° C. and in the presence of a first polar organic solvent selected from the group consisting of cyclic and acyclic carboxylic acid amides having from 3 to 6 carbon atoms per molecule a stoichiometric excess of a first alkali metal monosulfide with a polymer formed by reacting at least one polyhalo compound selected from the group consisting of:

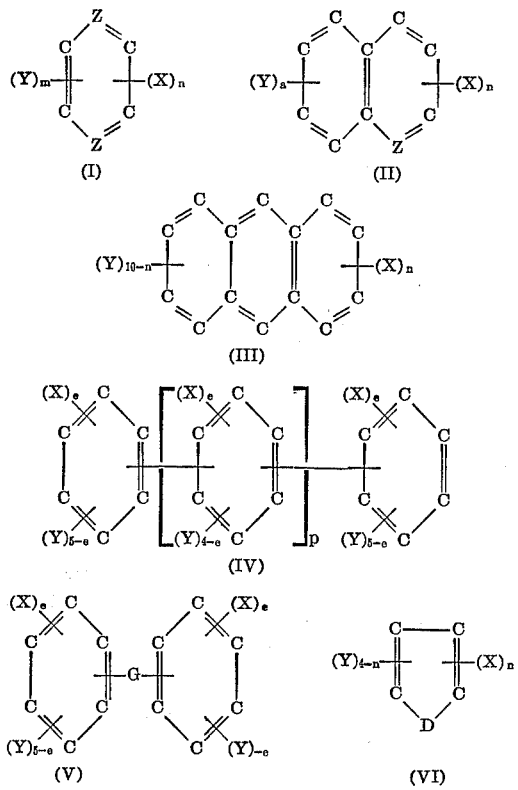

wherein each X is a halogen selected from the group consisting of chlorine, bromine, iodine, and fluorine, each Y is selected from the group consisting of hydrogen, —R, —N(R)$_2$,

—O—R', —S—R', —SO$_3$H, and —SO$_3$M, wherein each —R is selected from the group consisting of hydrogen and alkyl, cycloalkyl, aryl, aralkyl and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

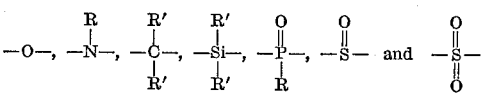

M is an alkali metal selected from the group consisting of sodium, potassium, lithium, rubidium and cesium; n is selected from the group consisting of 2 and 3; when both Z's in Formula I are —C=, m eqauls 6—n; when one Z in Formula I is —C=, m equals 5—n; when both Z's in Formula I are —N=, m equals 4—n; when Z in Formula II is —C=, a equals 8—n; when Z in Formula II is —N=, a equals 7—n; each e is a whole integer of from 0 to 3 such that the total halogen atoms in the compounds of Formulas IV and V is at least 2 and does not exceed 4; and p is a whole integer selected from the group consisting of 0 and 1, with a second alkali metal monosulfide in the presence of a second polar organic solvent selected from the group consisting of cyclic and acyclic carboxylic acid amides having from 3 to 6 carbon atoms per molecule, the mol ratio of said polyhalo compound to said second alkali metal monsulfide being from 0.9/1 to 1.1/1 and acidifying the reaction product of said first alkali metal monosulfide with said polymer with a mineral acid to produce the desired thiol.

8. A method according to claim 7 wherein the solvent is at least one of the following: N-methyl-2-pyrrolidone, pyrrolidone, caprolactam, N-ethylcaprolactam, sulfolane, dimethylacetamide, tetramethylurea, hexamethylphosphoramide, and N,N'-ethylenedipyrrolidone.

9. A method for the preparation of a thiol comprising contacting at a temperature of at least 250° C. and in the presence of a first polar organic solvent selected from the group consisting of cyclic and acyclic carboxylic acid amides having from 3 to 6 carbon atoms per molecule a stoichiometric excess of a first alkali metal monosulfide with a polymer formed by reacting at least one dihalo aromatic selected from the group consisting of dihalobenzene, dihalotoluene, dihaloxylene, dihaloethylbenzene, dihalodiethylbenzene, dihalonaphthalene, dihalomethylnaphthalene, dihalodimethylnaphthalene, dihaloethylnaphthalene and dihalodiethylnaphthalene wherein the halo part is selected from the group consisting of chlorine and bromine with a second alkali metal monsulfide in the presence of a second polar organic solvent selected from the group consisting of cyclic and acyclic carboxylic acid amides having from 3 to 6 carbon atoms per molecule, the mol ratio of said dihalo aromatic to said second alkali metal monosulfide being from 0.9/1 to 1.1/1, and acidifying the reaction product of said first alkali metal monosulfide with said polymer to a pH of at least 6.5 with a mineral acid to produce the desired thiol.

10. A method for the preparation of a thiol comprising contacting at a temperature of at least 250° C. and in the presence of N-methyl-2-pyrrolidone a stoichiometric excess of an alkali metal monosulfide with poly(phenylene sulfide), the amount of alkali metal monosulfide present being in the range of from about 1/1 to about 5/1 gram mol of alkali metal monosulfide per gram atom of sulfur present in the polymer, and acidifying the reaction product to a pH of at least 6.5 with a mineral acid to produce the desired thiol.

11. A method for the preparation of a thiol comprising contacting at a temperature of at least 250° C. and in the presence of a polar organic solvent a stoichiometric excess of an alkali metal monosulfide with at least one material selected from the group consisting of diaryl sulfides and di(alkaryl)sulfides represented by the formula $$R''\text{---}S\text{---}R''$$

wherein each R" is selected from the group consisting of aryl and alkaryl radicals containing from 6 to 18 carbon atoms per molecule and acidifying the reaction product with a mineral acid to produce the desired thiol.

12. A method for the preparation of a thiol comprising contacting at a temperature of at least 250° C. and in the presence of a polar organic solvent selected from the group consisting of cyclic and acyclic carboxylic acid amides having from 3 to 6 carbon atoms per molecule a stoichiometric excess of an alkali metal monosulfide with a diaryl sulfide represented by the formula R"—S—R" wherein each R" is an aryl radical containing from 6 to 10 carbon atoms per molecule and acidifying the reaction product to a pH of at least 6.5 with a mineral acid to produce the desired thiol.

13. A method for the preparation of a thiol comprising contacting at a temperature of at least 250° C. and in the presence of N - methyl - 2-pyrrolidone a stoichiometric excess of an alkali metal monosulfide with diphenyl sulfide, the amount of alkali metal monosulfide present being in the range of from about 1/1 to about 5/1 gram mols of alkali metal monosulfide per gram atom of sulfur present in the diphenyl sulfide, and acidifying the reaction product to a pH of at least 6.5 with a mineral acid to produce the desired thiol.

References Cited

UNITED STATES PATENTS 2,949,488  8/1960  Rocklin _____ 260—609

CHARLES B. PARKER, *Primary Examiner.*

D. R. PHILLIPS, *Assistant Examiner.*

U.S. Cl. X.R.

260—79.1, 250, 283, 294.8, 326.3, 326.9, 327, 347.2, 448.2, 470, 505, 516, 552, 576, 562, 607, 967

UNITED STATES PATENT OFFICE
CERTIFICATE OF CORRECTION

Patent No. 3,415,889  December 10, 1968

Rector P. Louthan

It is certified that error appears in the above identified patent and that said Letters Patent are hereby corrected as shown below:

Column 7, line 68, the claim reference numeral "2" should read -- 1 --. Column 8, Formula (II), that portion of the formula reading $\diagdown_C \diagup\!\!\!\diagup$ should read $\diagdown_Z \diagup\!\!\!\diagup$ Column 9, line 20, after "dihalonaphthalene" insert -- dihalomethylnaphthalene, dihalodimethylnaphthalene, --; line 20, "and dihaloethylnaphtha" should read -- and dihalodiethylnaphtha --. Column 10, line 35, "eqauls" should read -- equals --.

Signed and sealed this 24th day of March 1970.

(SEAL)
Attest:

Edward M. Fletcher, Jr.
Attesting Officer

WILLIAM E. SCHUYLER, JR.
Commissioner of Patents